United States Patent [19]

Cekorich

[11] Patent Number: 4,948,252

[45] Date of Patent: Aug. 14, 1990

[54] SUB-TAU PHASE MODULATION IN A FIBER-OPTIC ROTATION SENSOR

[75] Inventor: Allen C. Cekorich, Temple City, Calif.

[73] Assignee: Litton Systems, Inc., Beverly Hills, Calif.

[21] Appl. No.: 356,272

[22] Filed: May 24, 1989

[51] Int. Cl.$^5$ .............................................. G01B 9/02
[52] U.S. Cl. .................................................... 356/350
[58] Field of Search ......................................... 356/350

[56] References Cited

U.S. PATENT DOCUMENTS 4,707,136 11/1987 Kim ..................................... 356/350

OTHER PUBLICATIONS

Fiber–Optic Gyroscopes: Advances and Future Developments, Pavlath et al., Navigation, 1984, pp. 70–83.

Primary Examiner—Vincent P. McGraw
Assistant Examiner—S. A. Turner
Attorney, Agent, or Firm—Bright & Lorig

[57] ABSTRACT

A method and apparatus are disclosed for closed-loop phase modulation to measure rate and control phase modulator gain errors in an electrical signal representing the phase difference between first and second light signals from light waves counterpropagating in an interferometric rotation sensor including a closed light path with a phase modulator in the path. The disclosed method and apparatus correct phase modulator gain in a way that is independent of rate.

20 Claims, 2 Drawing Sheets

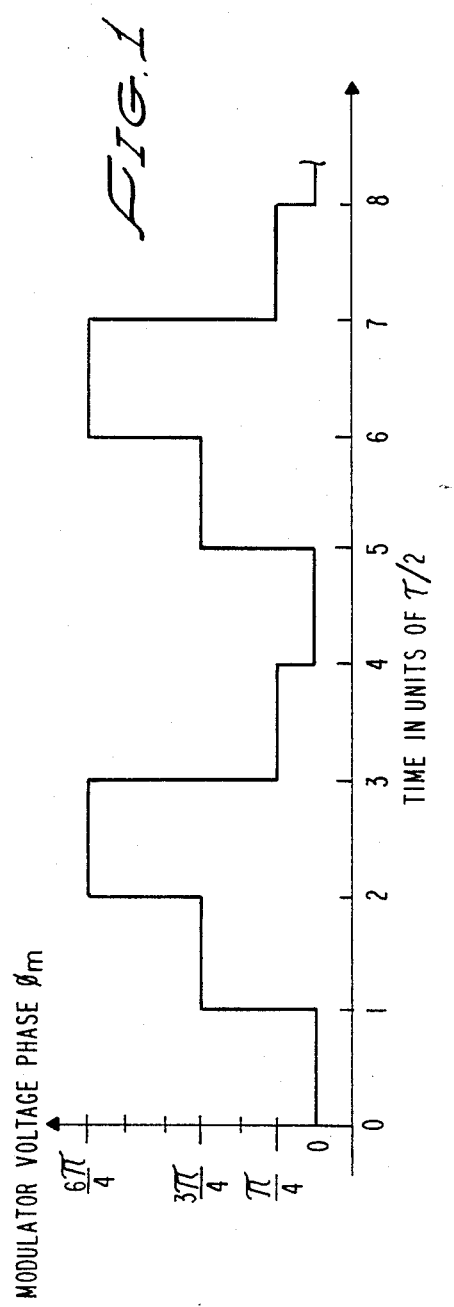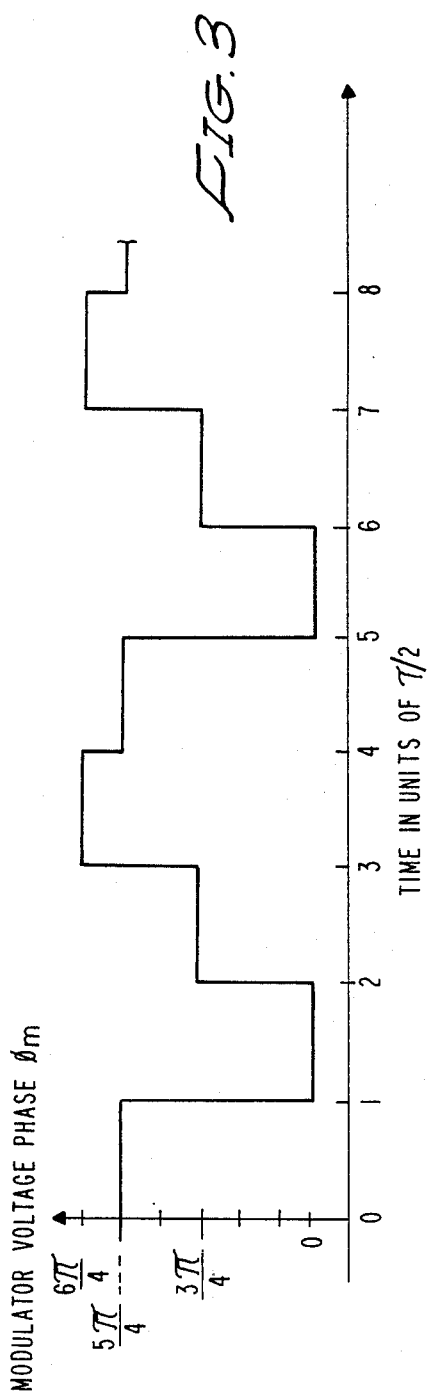

SUB-TAU PHASE MODULATION IN A FIBER-OPTIC ROTATION SENSOR

BACKGROUND OF THE INVENTION

1. Field of the Invention

The invention relates generally to fiberoptic rotation sensors, and especially to apparatus and methods for measuring the rotation-induced phase shift between light waves counterpropagating in the fiberoptic coil of a Sagnac interferometer to determine the rate of rotation of the coil.

2. Description of the Related Art

A fiberoptic interferometer used for rotation sensing and measurement generally comprises a coherent source of light, a multiturn optical fiber coil, means for coupling light from the source into and out of the coil, and means for detecting and processing an interference light signal coming from the coil. The interferometer "proper" frequency is defined as $\frac{1}{2}\tau$, where $\tau$ is the time required for light to travel around the gyro coil.

There are two types of disturbances in an optical path that can give rise to phase shifts in light waves traveling in opposite directions around a closed optical path: reciprocal and nonreciprocal. A reciprocal disturbance is one that affects either light wave in a similar manner despite the fact that the two waves are traveling in different directions and may be subjected to the disturbance at different times. A nonreciprocal disturbance affects the two waves differently, either because it occurs over a time interval comparable to the time it takes a wave to travel around the closed path, or because the effect it has on a wave depends on the direction of propagation of the wave around the closed path.

The Sagnac effect, a relativistic phenomenon, is a nonreciprocal effect in which the rotation of a closed optical path causes light waves propagating in opposite directions along the path to take different amounts of time to complete a transit of the closed path. This difference in transit time results in a phase difference between the two light waves proportional to rotation rate. When the beams are recombined on a photodetector, they give rise to an interference pattern which is a function of the nonreciprocal phase difference or shift. Measurement of the phase difference provides a measure of the rate of rotation of the optical path.

If $\Delta\phi$ denotes the Sagnac phase difference between two recombined counterpropagating light beams, the intensity of light due to the interfering beams varies as $\cos(\Delta\phi)$. When the phase difference is close to zero, the cosine function varies only slightly with changes in phase difference. In order to increase the sensitivity of detection, it is advantageous to introduce artificially an added fixed phase shift or "bias" to shift to a point of operation on the cosine curve where the rate of change of output intensity with respect to $\Delta\phi$ is greater. In particular, maximum sensitivity and linearity of response are achieved by shifting to a point such as $\pi/2$. At this point, the light intensity is proportional to $\cos(\Delta\phi+\pi/2)=\sin(\Delta\phi)$. The periodic nature of the cosine function results in an equivalent maximum sensitivity and linearity of response (apart from algebraic sign) at any odd integral multiple of plus or minus $\pi/2$.

It has proven difficult to a construct a sufficiently stable device for introducing a nonreciprocal bias. In order to obviate stability problems, various methods have been proposed for modulating the phase of the light waves propagating within the closed optical path of a Sagnac interferometer.

A phase modulator device can be based, for example, on the change in refractive index with applied voltage in an electro-optic crystal forming part of the closed optical path of the interferometer. If the phase modulator is placed near one end of the fiber coil, application of a voltage to the modulator produces a phase shift in one of the counterpropagating waves that is not experienced by the other until it has traveled all the way around the coil. There the second wave experiences a phase shift which is delayed by the length of time required for light to propagate around the coil, a time given by $$\tau_o = nL/c,$$

where n is the index of refraction of the fiber material, L is the length of the fiber coil, and c is the speed of light in vacuum. If $V(t)$ is a time-varying signal applied to the phase modulator, the phase difference $\phi_m(t)-\phi_m(t-\tau)$ between the counterpropagating light waves is proportional to $V(t)-V(t-\tau_o)$. In this way a phase bias can be produced which sets the operating point of the interferometer.

If there is a rotation of the fiber coil, a phase shift $\Delta\phi$ will be added to the phase bias due to the nonreciprocal nature of the Sagnac effect. Although it is possible to use the output signal of the photodetector to measure the rotation directly, it is preferable to use a "nulling" or "zeroing" method to measure the rotation indirectly, in order to avoid errors resulting from drifts in the light level dependence and to produce a linear scale factor. The idea is to generate electrically a negative feedback signal which is equal in magnitude but opposite in sign to the rotationally-induced signal, and to use the feedback signal to "null" or "zero" the rotation signal. Application of the feedback modulation signal to the phase modulator produces a phase difference between the counterpropagating waves which is continuously equal and opposite in sign compared to the phase shift induced by the rotation of the closed optical path. A method such as this in which there is a closed feedback loop is often referred to as a "closed-loop" method.

One method of phase modulation used in closed-loop methods, generally known as the "serrodyne method", generates a feedback modulation signal which is a voltage ramp signal having a slope proportional to $\Delta\phi_o/\tau_o$, where $\phi_o$ is a constant rotationally-induced phase shift and $\tau_o$ is the time taken for a light wave to travel around the closed light path of the interferometer in the absence of any rotation. Since the phase ramp signal cannot increase indefinitely, the serrodyne method actually generates a sawtooth waveform with a peak-to-peak amplitude of $2\pi$ radians, with the $2\pi$ phase transition effectively resetting the operating point of the interferometer to an equivalent position on the curve relating output signal to input phase difference. A bias modulation signal consists of a voltage square-wave having an amplitude which induces a phase shift of plus or minus $\pi/2$ radians and a frequency equal to $\frac{1}{2}\tau_o$.

U.S. Pat. No. 4,705,399 to Graindorge et al., entitled "Device for Measuring a Nonreciprocal Phase Shift Produced in a Closed-Loop Interferometer," discloses a serrdyne phase modulation method in which a digital phase ramp in the form of a staircase-shaped voltage feedback signal is combined with a bias modulation signal consisting of a voltage square-wave having an amplitude which induces a phase shift of plus or minus $\pi/2$ radians and a frequency equal to $\frac{1}{2}\tau_o$. The digital staircase signal consists of a sequence of voltage steps, each of duration $\tau_o$. In general, the amplitude of each step change is calculated to provide a nonreciprocal phase shift of plus or minus $\pi/2$ radians minus the Sagnac phase shift. The step sequence is generally n steps of positive voltage levels followed by n steps of negative voltage levels. The light intensity output of the interferometer fiber loop is demodulated at the bias modulation frequency or some multiple thereof, namely $\frac{1}{2}n\tau_o$, where n is a nonzero integer.

The resulting signal is proportional to the Sagnac phase shift. This signal is used in a closed-loop type of operation to continuously null the Sagnac phase shift. To avoid problems with voltage saturation, the modulation steps are occasionally required to "roll over" or start over again by the application of a step voltage signal. The step voltage applied to the phase modulator is adjusted to provide an additional phase shift of $2\pi m$ radians (where m is an integer) to keep the voltage to the phase modulator in a resonable operating range. Additional demodulation logic may be employed during these roll-overs to determine the error in estimated phase modulator gain. Through subsequent roll-overs, the scale factor error or gain error may be nulled. The scale factor or gain is the proportionality constant relating the phase induced by the phase modulator in response to a given value of input voltage.

Another phase modulation method which can be used is direct digital feedback, which is also a closed-loop method. Such a method is disclosed in U.S. patent application Ser. No. 031,323, entitled "Rotation Rate Nulling Servo and Method for Fiberoptic Rotation Sensor," by Jim Steele, filed Mar. 27, 1987, and assigned to the assignee of the present invention. The application by Steele is hereby incorporated by reference into the present application.

The Steele application discloses a direct digital feedback circuit which operates by alternately presetting the voltage drive on the phase modulator to zero and waiting for at least one transit time $\tau_o$, then switching the phase modulator voltage to a level corresponding to a nonreciprocal phase shift which is the difference between a reference ($-3\pi/2$, $-\pi/2$, $+\pi/2$, $+3\pi/2$ radians) and the Sagnac phase signal. The resulting light intensity signal is gated and observed for one transit time $\tau_o$ immediately following the setting of the reference voltage. The process is repeated in a predetermined sequence of reference levels and the results are processed to continuously develop a Sagnac phase estimate and a phase modulator scale factor or gain error (secondary control) with which to adjust the amplitudes of the voltages to the phase modulator.

The overall scale factor or gain for an open-loop interferometer is the product of the Sagnac scale factor or gain and the phase modulation scale factor or gain. The Sagnac scale factor is the constant of proportionality between rate of rotation of the closed light path and the Sagnac phase difference. The phase modulation scale factor is the constant of proportionality between the phase shift effected by the phase modulator and the input voltage to the phase modulator.

The modulation signal applied to the phase modulator in a Sagnac interferometer must provide for rate and scale factor correction signals that are derived from the detected light signal from the interferometer. Voltage signal waveforms previously utilized in phase modulation methods have detected rate at other than the proper frequency, which has led to measurement errors.

SUMMARY OF THE INVENTION

In accordance with the invention, a method is presented using closed-loop phase modulation to measure rate and control scale factor errors in an electrical signal representing the phase difference between first and second light signals from lightwaves counterpropagating in an interferometric rotation sensor which includes a phase modulator as part of a closed light path. The method comprises generating a serrodyne signal responsive to a rate signal derived from the electrical phase-difference signal at a first frequency; producing a rate bias signal consisting of a periodic square having that first frequency; producing a gain bias signal consisting of a sequence of step-voltage transitions at the ends of successive equal intervals of time equal to half the period of the serrodyne signal; summing the serrodyne signal, the rate bias signal, and the gain bias signal to produce a summed phase modulation signal; multiplying the summed phase modulation signal with a gain signal derived from the electrical phase-difference signal at a second frequency twice the first frequency to produce a corrected summed phase modulation signal; and applying the corrected phase modulation signal to the phase modulation means.

In a preferred embodiment, an apparatus for closed-loop phase modulation to measure rate and control phase modulator gain errors in an electrical signal representing the phase difference between first and second light signals from lightwaves counterpropagating in an interferometric rotation sensor including a closed light path with a phase modulation means therein comprises a first bandpass filter for filtering out a first signal from the electrical phase-difference signal at a proper frequency characteristic of the closed light path, given by $\frac{1}{2}\tau$ where $\tau$ is a time required for light to travel around the closed light path; a second bandpass filter for filtering out a second signal from the electrical phase-difference signal at twice the proper frequency; a clock producing a first clock signal output at the proper frequency and a second clock signal output at twice the proper frequency; a first mixer for mixing the first signal with the first clock signal; a second mixer for mixing the second signal with the second clock signal; a serrodyne signal generator for generating a serrodyne signal; a rate bias generator for generating a periodic rate bias signal; a gain bias generator for generating a periodic gain bias signal; a first integrator for summing a rate error signal from the first mixer and sending a rate signal to the serrodyne generator; a second integrator for summing a gain error signal from the second mixer and producing a gain signal; an adder for adding the serrodyne signal to the rate bias signal and to the gain bias signal to produce a total phase bias signal; and a multiplier for multiplying the gain signal and the total phase bias signal to produce a multiplied signal which is amplified and then applied to the phase modulator.

The phase bias signal waveform is chosen so that rotation rate is measured at the interferometer proper frequency and a scale-factor signal is maintained in the electrical phase-difference signal from the interferometer. The phase bias signal waveform is chosen to give a sequence of phase shifts $-\pi/2$, $-\pi/2+2\pi$, $+\pi/2$, and $+\pi/2-2\pi$ radians, so that the $2\pi$ roll-over is tested every $\tau$ seconds or at any frequency which is a higher harmonic of $1/\tau$. In the case of higher harmonics, testing is done at successive times separated by less than $\tau$ seconds. This is the origin of the description "sub-tau modulation."

FIG. 1 is a graph of a phase bias voltage waveform in accordance with the invention which is the sum of the rate bias signal and the gain bias signal. The vertical axis is the phase bias voltage in units of induced phase shift. The horizontal axis is time in units of $\tau/2$, where $\tau$ is the fiber coil light transit time. The induced phase shift $\phi_m(t) - \phi_m(t-\tau)$ for successive time differences and no input rate is given by

| time difference | induced phase shift in radians |
|---|---|
| 2-0 | $6\pi/4 - = 0\ 6\pi/4 - 2\pi = -\pi/2$ |
| 3-1 | $\pi/4 - 3\pi/4 = -2\pi/4 = -\pi/2$ |
| 4-2 | $0 - 6\pi/4 = -6\pi/4 + 2\pi = \pi/2$ |
| 5-3 | $3\pi/4 - \pi/4 = 2\pi 4 = \pi/2$ |

The time intervals 0 to 1 and 1 to 2 compared to the intervals 2 to 3 and 3 to 4 generate a proper frequency harmonic proportional to the rotation rate. The time intervals 0 to 1 compared to the interval 1 to 2 and again the interval 2 to 3 compared to the interval 3 to 4 give a harmonic at twice the proper frequency ($\frac{1}{2}\tau$) proportional to the scale factor.

An alternative phase bias signal voltage waveform is shown in FIG. 3. In FIG. 3 the vertical axis is the sum of the rate bias and the gain bias voltage in units of induced phase shift. The horizontal axis is time in units of $\tau/2$, where $\tau$ is the fiber coil light transit time. The induced phase shift $\phi_m(t) - \phi_m(t-\tau)$ for successive time differences and no input rate is given by

| time difference | induced phase shift in radians |
|---|---|
| 2-0 | $3\pi/4 - 5\pi/4 = -2\pi/4 = -\pi/2$ |
| 3-1 | $6\pi/4 - = 6\pi/4 - 2\pi = -\pi/2$ |
| 4-2 | $5\pi/4 - 3\pi/4 = 2\pi/4 = \pi/2$ |
| 5-3 | $0 - 6\pi/4 = -6\pi/4 + 2\pi = \pi/2$ |

The time intervals 0 to 1 and 1 to 2 compared to the intervals 2 to 3 and 3 to 4 generate a proper frequency harmonic proportional to the rotation rate. The time intervals 0 to 1 compared to the interval 1 to 2 and again the interval 2 to 3 compared to the interval 3 to 4 give a harmonic at twice the proper frequency ($\frac{1}{2}\tau$) proportional to the scale factor. The waveform may be modified by an added offset.

BRIEF DESCRIPTION OF THE DRAWINGS

The various features and advantages of the present invention are apparent in light of the following detailed description taken together with the accompanying drawings, in which:

FIG. 1 is a graph of a phase bias voltage waveform in accordance with the invention which is the sum of the rate bias signal and the gain bias signal;

FIG. 3 is a graph of an alternative phase bias voltage waveform in accordance with the invention which is the sum of the rate bias signal and the gain bias signal.

DESCRIPTION OF THE PREFERRED EMBODIMENT

Figure 2:
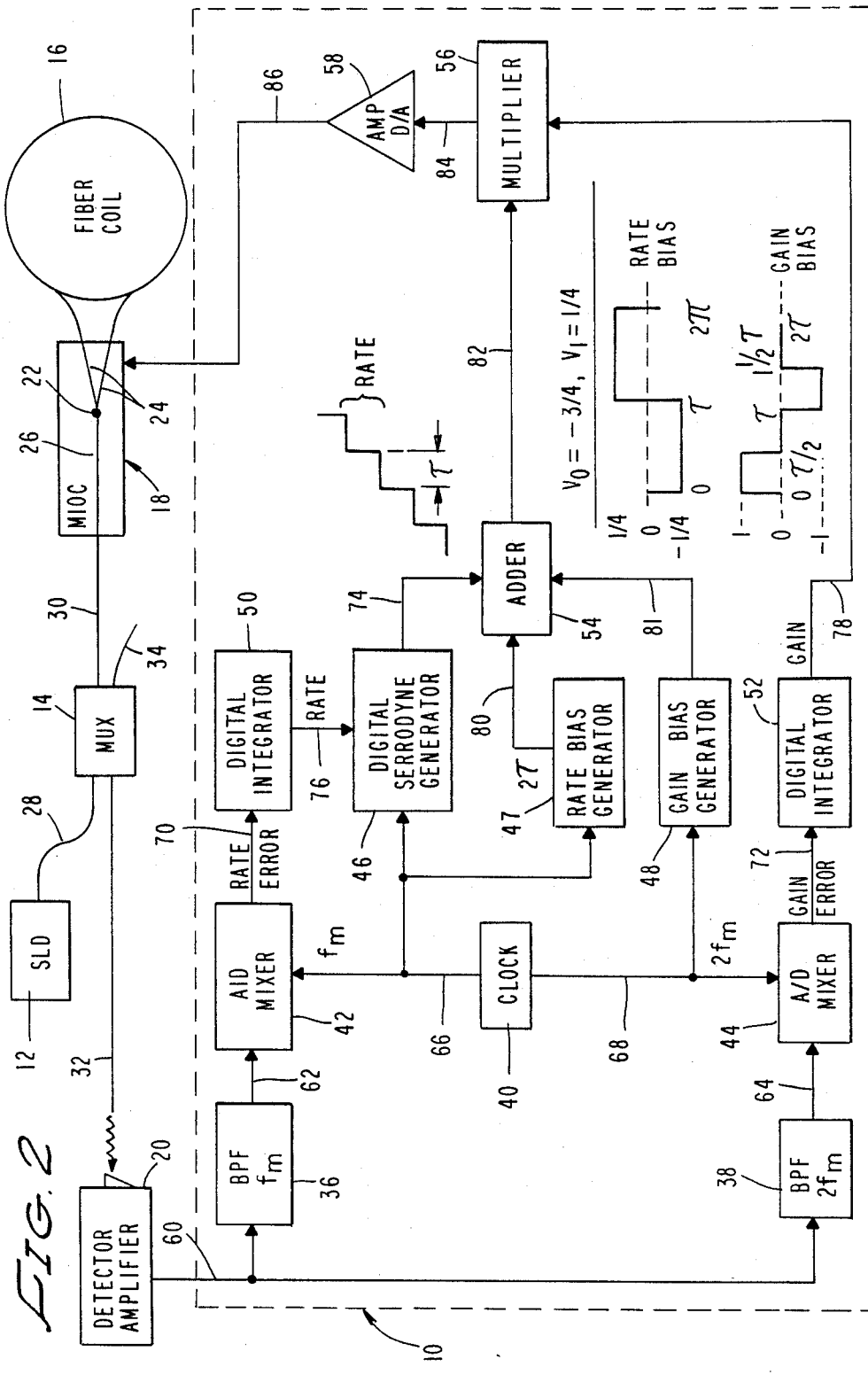
FIG. 2 is a schematic block diagram of a phase modulation apparatus in accordance with the invention operating in conjunction with a fiber-coil rotation-sensing interferometer.

Methods and apparatus are presented in accordance with the invention for closed-loop phase modulation to measure rate and control phase modulator gain errors in an electrical signal representing the phase difference between first and second light signals from lightwaves counterpropagating in an interferometric rotation sensor including a closed light path with a phase modulation means.

FIG. 2 is a schematic block diagram of an apparatus 10 in accordance with the invention operating in conjunction with a fiber-coil rotation sensing interferometer. In FIG. 2 the fiber-coil rotation sensing arrangement comprises a coherent or semicoherent light source 12, a directional fiber coupler 14, a fiberoptic coil 16, a multifunction integrated optics chip (MIOC) 18, and a detector-amplifier 20. Near one end of MIOC 18 is a Y-beamsplitter 22, both arms of which are subject to the influence of an electro-optic phase modulation device 24. A polarizer 26 on multifunction integrated optics chip 18 precedes the Y-beamsplitter 22. The light output from coherent light source 12 travels along a length of optical fiber 28 to directional fiber coupler 14. A length of fiber 30 connects directional coupler 14 with multifunction integrated optics chip 18.

A light beam output from multiplexing coupler 14 travels along a length of fiber 32 and is coupled to detector/amplifier 20. Directional coupler 14 has an output fiber 34, shown as a stub, which can be connected to a source wavelength stabilization unit.

Referring to FIG. 2, the apparatus 10 comprises a first bandpass filter 36, a second bandpass filter 38, a clock 40, a first digital mixer 42, a second digital mixer 44, a digital serrodyne signal generator 46, a digital rate bias generator 47, a digital gain bias generator 48, a first digital integrator 50, a second digital integrator 52, an adder 54, a multiplier 56, and a digital-to-analog converter and amplifier 58.

The phase modulation apparatus 10 has an input 60 from detector-amplifier 20 of the fiberoptic Sagnac rotation sensor shown in FIG. 2 which supplies a common input signal to first bandpass filter 36 and to second bandpass filter 38. The output 62 of first bandpass filter 36 is a signal representative of the relative phase difference between first and second lightwaves counterpropagating around the closed light path of the fiberoptic coil 16. The phase modulator 24 operates in push-pull to induce phase changes of opposite sense in the two lightwaves as they start out on their journeys in opposite directions around the fiber coil 16. The light waves are combined to interfere at the detector of detector-amplifier 20 and an electrical signal derived from their relative phase difference represents a rotation of the closed light path they both have travelled.

The output signal 62 of first bandpass filter 36 is in a frequency pass band centered on a proper frequency characteristic of the closed light path, given by $\frac{1}{2}\tau$ where $\tau$ is the time required for light to transit the closed light path. An output signal 64 from second bandpass filter 38 is a signal representative of the relative phase difference caused by gain errors between first and second lightwaves counterpropagating around the closed light path of the fiberoptic coil 16. Signal 64 is in a frequency pass band centered on a frequency equal to $1/\tau$, which equals twice the proper frequency.

Clock 40 produces a first clock signal output 66 at the proper frequency $\frac{1}{2}\tau$ and a second clock signal output 68 at twice the proper frequency, namely $1/\tau$. The proper frequency depends on the length of the fiber loop and the index of refraction of the fiber material. The clock 40 must be set to the proper frequency, which can be determined, for example, by measurement. First digital mixer 42 takes first bandpass-filtered signal 62 and mixes it with first clock signal 66 to produce a digital mixed output signal 70 which is indicative of the rotational rate error. Second digital mixer 44 mixes second bandpass-filtered signal 64 with second clock signal 68 to produce a dc output signal 72 which is indicative of the gain error.

Digital serrodyne generator 46 generates a serrodyne signal at an output 74. There are two inputs to serrodyne generator 46, a first input carrying first clock signal 66 and a second input from a first digital integrator 50. First digital integrator 50 integrates a rotation rate error signal 70 from first digital mixer 42 and sends a control signal 76 to digital serrodyne generator 46 which is used in setting the slope of the serrodyne voltage waveform at 74. Second digital integrator 52 produces a gain error control signal 78 by integrating a gain error signal from second digital mixer 44 at output 72.

Digital bias generator 48 produces a periodic bias signal output 80 having a predetermined shape, making use of an input 68 from clock 40 carrying the second clock signal at $2f_m$. Information determining the predetermined shape of the periodic bias signal can be hard-wired into the circuitry of digital rate bias generator 47 and digital gain bias generator 48 or programmed into a microprocessor forming part of 48. As explained below, there is some freedom of choice in the shape of the periodic bias signal.

Adder 54 is used to add the serrodyne signal from said output 74 of digital serrodyne generator 46, the rate bias signal 80 from digital rate bias generator 47, and the gain bias signal 81 from digital gain bias generator 48 and the periodic bias signal 80 to produce an added signal at an output 82. The gain control signal from output 78 of second digital integrator 52 and the added signal at output 82 of adder 54 are multiplied by a multiplier 56 to produce a multiplied signal at an output 84.

Digital-to-analog converter and amplifier 58 converts the digital input signal from output 84 of multiplier 56 into an analog signal and amplifies that signal to produce an amplified analog signal 86 for application to phase modulation device 24 to modulate the phases of the two lightwaves counterpropagating around the closed light path of the fiberoptic coil 16.

Phase modulation device 24 is preferably based on the electro-optic effect in a material such as $LiNbO_3$. The phase of a lightwave depends on the optical path length it has traveled, where optical path length is the product of actual path length and the index of refraction along the path. The phase of a lightwave traveling along an arm of Y-beamsplitter 22 can be altered by changing the index of refraction in response to an voltage applied to a set of spaced electrodes with a $LiNbO_3$ channel waveguide constituting an arm.

FIG. 1 is a graph of the sum of the output waveform 80 of rate bias generator 47 and output waveform 81 of gain bias generator 48 in one possible embodiment of the invention. The vertical axis is voltage in units of induced phase shift. The horizontal axis is time in units of $\tau/2$, where $\tau$ is the fiber coil light transit time. The induced phase shift $\phi_m(t)-\phi_m(t-\tau)$ for successive time differences and no input rate is given by

| time difference | induced phase shift in radians |
| --- | --- |
| 2-0 | $6\pi/4 - 0 = 6\pi/4 - 2\pi = -\pi/2$ |
| 3-1 | $\pi/4 - 3\pi/4 = -2\pi/4 = -\pi/2$ |
| 4-2 | $0 - 6\pi/4 = -6\pi/4 + 2\pi = \pi/2$ |
| 5-3 | $3\pi/4 - \pi/4 = 2\pi/4 = \pi/2$ |

The time intervals 0 to 1 and 1 to 2 compared to the intervals 2 to 3 and 3 to 4 generate a proper frequency harmonic proportional to the rotation rate. The time intervals 0 to 1 compared to the interval 1 to 2 and again the interval 2 to 3 compared to the interval 3 to 4 give a harmonic at twice the proper frequency ($\frac{1}{2}\tau$) proportional to the scale factor. The waveform may be modified by an offset.

In another possible embodiment of the invention, digital bias generator 48 provides an alternative sum of the output waveforms 80 and 81 as shown in FIG. 3. The vertical axis in FIG. 3 is voltage in units of induced phase shift and the horizontal axis is time in units of $\tau/2$, where $\tau$ is the fiber coil light transit time. The induced phase $\phi_m(t)-\phi_m(t-\tau)$ shift for successive time differences and no input rate is given by

| time difference | induced phase shift in radians |
| --- | --- |
| 2-0 | $3\pi/4 - 5\pi/4 = -2\pi/4 = -\pi/2$ |
| 3-1 | $6\pi/4 - 0 = 6\pi/4 - 2\pi = -\pi/2$ |
| 4-2 | $5\pi/4 - 3\pi/4 = 2\pi/4 = \pi/2$ |
| 5-3 | $0 - 6\pi/4 = -6\pi/4 + 2\pi = \pi/2$ |

The time intervals 0 to 1 and 1 to 2 compared to the intervals 2 to 3 and 3 to 4 generate a proper frequency harmonic proportional to the rotation rate. The time intervals 0 to 1 compared to the interval 1 to 2 and again the interval 2 to 3 compared to the interval 3 to 4 give a harmonic at twice the proper frequency ($\frac{1}{2}\tau$) proportional to the scale factor. The waveform may be modified by an offset.

THEORY OF OPERATION

The optical power from a Sagnac gyro at time t is given by $$P(t) = P_b + \tfrac{1}{2}P_o[1 + \cos(\phi_s + \phi_m(t) + \phi_m(t-\tau))]$$

where $P_b$ is background power, $P_o$ is phase-sensitive power, $\phi_s$ is rotation-induced phase shift, $\phi_m$ is phase modulator induced phase shift, and $\tau$ is the transit time of light through the gyro loop.

"Sub-tau modulation" means that the phase modulator drive voltage is step changed every one-half $\tau$ seconds forming the time sequence $$t_n = n\tau/2, \; n = 0, 1, 2, \ldots$$

describing the operation of the modulation. The desired phase shift sequence from the phase modulator voltage is $$\phi_m(t_2) - \phi_m(t_0) = -\phi_f + 3\pi/2$$
$$\phi_m(t_3) - \phi_m(t_1) = -\phi_f - \pi/2$$
$$\phi_m(t_4) - \phi_m(t_2) = -\phi_f - 3\pi/2$$
$$\phi_m(t_5) - \phi_m(t_3) = -\phi_f + \pi/2$$
$$\phi_m(t_6) - \phi_m(t_4) = -\phi_f + 3\pi/2$$
$$\phi_m(t_7) - \phi_m(t_5) = -\phi_f - \pi/2$$

$$\phi_m(t_8) - \phi_m(t_6) = -\phi_f - 3\pi/2$$
$$\phi_m(t_9) - \phi_m(t_7) = -\phi_f + \pi/2$$
.
.
.

where $\phi_f$ is the phase fed back to the gyro to cancel the rotation induced phase shift $\phi_s$. The bias sequence $$3\pi/2, -\pi/2, -3\pi/2, \pi/2$$

has two functions. The first is to generate an optical power output square wave with frequency $\frac{1}{2}\tau$ whose amplitude indicates the deviation from zero of the quantity $$\phi_s - \phi_f$$

which is used to adjust the feedback phase $\phi_f$ to null the gyro. The second is to generate a square wave with frequency $1/\tau$ whose amplitude indicates the deviation of the bias from the desired values; this square wave is used to adjust the gain G of the phase modulator voltage.

A voltage V applied to the phase modulator results in a phase shift of $$V = G\phi_m \text{ radians}$$

where the voltage is measured in radian units so that under proper closed loop operation $G=1$. The feedback phase $\phi_f$ is expressed in terms of a feedback fraction F as $$\phi_f = F\pi, \quad -1 \leq F < 1.$$

The voltage sequence must be found that will induce the desired bias sequence and null the gyro. Writing the desired modulator-induced phase $\phi_m$ in terms of the modulator-applied voltage phase shift $V_n = V(t_n)$ produces the relations $$V_2 - V_0 = G\pi(-F + 3/2)$$
$$V_3 - V_1 = G\pi(-F - \frac{1}{2})$$
$$V_4 - V_2 = G\pi(-F - 3/2)$$
$$V_5 - V_3 = G\pi(-F + \frac{1}{2})$$
$$V_6 - V_4 = G\pi(-F + 3/2)$$
$$V_7 - V_5 = G\pi(-F - \frac{1}{2})$$
$$V_8 - V_6 = G\pi(-F - 3/2)$$
$$V_9 - V_7 = G\pi(-F + \frac{1}{2})$$
.
.
.

Solving for the voltage level sequence gives $$V_2 = G\pi(-F + 3/2) + V_0$$
$$V_3 = G\pi(-F - \frac{1}{2}) + V_1$$
$$V_4 = G\pi(-F - 3/2) + V_2$$
$$\quad = G\pi(-F - 3/2) + G\pi(-F + 3/2) + V_0$$
$$\quad = G\pi(-2F + 0) + V_0$$
$$V_5 = G\pi(-F + \frac{1}{2}) + V_3$$
$$\quad = G\pi(-F + \frac{1}{2}) + G\pi(-F - \frac{1}{2}) + V_1$$
$$\quad = G\pi(-2F + 0) + V_1$$
$$V_6 = G\pi(-F + 3/2) + V_4$$
$$\quad = G\pi(-F + 3/2) + G\pi(-2F + 0) + V_0$$
$$\quad = G\pi(-3F + 3/2) + V0$$
$$V_7 = G\pi(-F - \frac{1}{2}) + V_5$$
$$\quad = G\pi(-F - \frac{1}{2}) + G\pi(-2F + 0) + V_1$$
$$\quad = G\pi(-3F - \frac{1}{2}) + V_1$$
$$V_8 = G\pi(-F - 3/2) + V_6$$
$$\quad = G\pi(-F - 3/2) + G\pi(-3F + 3/2) + V_0$$
$$\quad = G\pi(-4F + 0) + V0$$
$$V_9 = G\pi(-F + \frac{1}{2}) + V_7$$
$$\quad = G\pi(-F + \frac{1}{2}) + G\pi(-3F - \frac{1}{2}) + V_1$$
$$\quad = G\pi(-4F + 0) + V_1$$
.
.
.

Summarizing the sequence:

$$V_2 = G\pi(-1F + 3/2) + V_0$$
$$V_3 = G\pi(-1F - \frac{1}{2}) + V_1$$
$$V_4 = G\pi(-2F + 0) + V_0$$
$$V_5 = G\pi(-2F + 0) + V_1$$
$$V_6 = G\pi(-3F + 3/2) + V_0$$
$$V_7 = G\pi(-3F - \frac{1}{2}) + V_1$$
$$V_8 = G\pi(-4F + 0) + V_0$$
$$V_9 = G\pi(-4F + 0) + V_1$$
.
.
.

Implementation of the above voltage sequence requires a serrodyne generator which will accumulate the feedback fraction F every $\tau$ and a bias generator which will add to the accumulated feedback each $\tau/2$ the next bias in the sequence $$3/2, -\frac{1}{2}, 0, 0.$$

The feedback accumulator must add or subtract 2 from its contents to insure that its value is greater than or equal to $-1$ and less than 1, which will result in a $2\pi$ rollover when the gain G is equal to 1. The even and odd voltages may be modified by their voltage offsets $V_o$ and $V_1$, respectively, which is the same as modifying the even and odd bias additions.

The voltage sequence $V(t_n)$ will generate a power sequence $P(t_n)$ with characteristics indicating deviation from rate null condition:

$$\phi_s = G\pi F$$

and deviation from gain null condition:

$$G = 1.$$

First consider the case where $G=1$ and $$\phi_s - G\pi F = \epsilon, \quad \epsilon << 1.$$

The power sequence $P(t_n) = P_n$ is $$P_2 \alpha \cos(\phi_s + V_2 - V_0)$$
$$\quad = \cos(\phi_s - \pi F + 3\pi/2)$$
$$\quad = \cos(\epsilon - \pi/2), \text{ since } 3\pi/2 = -\pi/2 + 2\pi$$
$$\quad = \sin \epsilon$$
$$\quad \approx \epsilon$$
$$P_3 \alpha \cos(\phi_s + V_3 - V_1)$$
$$\quad = \cos(\phi_s - \pi F - \pi/2)$$
$$\quad = \cos(\epsilon - \pi/2)$$
$$\quad = \sin \epsilon$$
$$\quad \approx \epsilon$$
$$P_4 \alpha \cos(\phi_s + V_4 - V_2)$$
$$\quad = \cos(\phi_s - \pi F - 3\pi/2)$$
$$\quad = \cos(\epsilon + \pi/2), \text{ since } -3\pi/2 = \pi/2 - 2\pi$$
$$\quad = -\sin \epsilon$$
$$\quad \approx -\epsilon$$
$$P_5 \alpha \cos(\phi_s + V_5 - V_3)$$

-continued $$= \cos(\phi_s - \pi F + \pi/2)$$
$$= \cos(\epsilon + \pi/2)$$
$$= \sin -\epsilon$$
$$\approx -\epsilon$$

which will generate a square wave with period $2\tau$ and peak-to-peak amplitude $2\epsilon$ which will be zero if the rate null condition $\phi_s = G\pi F$ is met. The first harmonic of this square wave can be extracted by a bandpass filter at center frequency $f_m = \frac{1}{2}\tau$ and its amplitude measured by digital mixing with a square wave of frequency $f_m$. The measured amplitude is integrated to form the feedback fraction F which is used to close the rate loop.

Now consider the case where the rate is nulled:

$$\phi_s - G\pi F = 0$$

but the gain is different from unity:

$$G - 1 = \epsilon, \epsilon << 1.$$

The power sequence is $$P_2 \alpha \cos(\phi_s + V_2 - V_0)$$
$$= \cos(0 + G\pi 3/2)$$
$$= \cos((1 + \epsilon) \cdot 3\pi/2)$$
$$= \cos(-\pi/2 + 3\pi\epsilon/2)$$
$$= \sin(3\pi\epsilon/2) \approx 3\pi\epsilon/2$$
$$P_3 \alpha \cos(\phi_s + V_3 - V_1)$$
$$= \cos(0 + G\pi/2)$$
$$= \cos((1 + \epsilon) \cdot \pi/2)$$
$$= \cos(\pi/2 + \pi\epsilon/2)$$
$$= \sin(\pi\epsilon/2)$$
$$\approx -\pi\epsilon/2$$
$$P_4 \alpha \cos(\phi_s + V_4 - V_2)$$
$$= \cos(0 - G\pi 3/2)$$
$$= \cos((1 + \epsilon) \cdot 3\pi/2)$$
$$= \cos(-\pi/2 + 3\pi\epsilon/2)$$
$$= \sin(3\pi\epsilon/2)$$
$$\approx 3\pi\epsilon/2$$
$$P_5 \alpha \cos(\phi_s + V_5 - V_3)$$
$$= \cos(0 + G\pi/2)$$
$$= \cos((1 + \epsilon) \cdot \pi/2)$$
$$= \cos(\pi/2 + \pi\epsilon/2)$$
$$= \sin(\pi\epsilon/2)$$
$$\approx -\pi\epsilon/2$$

which will generate a square wave with period $\tau$ and peak-to-peak amplitude $2\pi\epsilon$ which will be zero if the gain null condition (G=1) is met. The first harmonic of this square wave can be extracted by a bandpass filter at center frequency $2f_m = 1/\tau$ and its amplitude measured by digital mixing with a square wave of frequency $2f_m$. The measured amplitude is integrated to form the gain multiplier G which is used to close the gain loop.

What is claimed is:

1. An apparatus for closed-loop phase modulation to measure rate and control phase modulator gain errors in an electrical signal representing the phase difference between first and second light signals from lightwaves counterpropagating in an interferometric rotation sensor including a closed light path with a phase modulation means therein comprising:

means for producing a serrodyne signal responsive to a rate signal derived from said electrical phase-difference signal at a first frequency;

means for producing a rate bias signal consisting of a periodic square wave having said first frequency;

means for producing a gain bias signal consisting of a sequence of step-voltage transitions at the ends of successive equal intervals of time equal to half the period of said serrodyne signal;

means for summing said serrodyne signal, said rate bias signal, and said gain bias signal to produce a summed phase modulation signal;

means for multiplying said summed phase modulation signal with a gain signal derived from said electrical phase-difference signal at a second frequency twice said first frequency to produce a gain-multiplied summed phase modulation signal; and means for applying said gain-multiplied summed phase modulation signal to said phase modulation means.

2. The apparatus of claim 1 wherein said successive equal intervals of time each have a duration given by $\tau/m$, where $\tau$ is the transit time for light traveling around said closed light path and m is an integer.

3. The apparatus of claim 2 wherein said integer is 2.

4. The apparatus of claim 1 wherein said means for producing a rate bias signal comprises means for producing a periodic phase bias of $\pi/2$ for a time $\tau$ followed by $-\pi/2$ for a time $\tau$, where $\tau$ is a time required for light to travel around said closed light path.

5. The apparatus of claim 1 wherein said gain bias signal comprises a periodic sequence of step-voltage transitions that gives rise to a sequence of induced phase shifts as follows: $2\pi$, 0, $-2\pi$, and 0 radians.

6. Apparatus for closed-loop phase modulation to measure rate and control phase modulator gain errors in an electrical signal representing the phase difference between first and second light signals from lightwaves counterpropagating in an interferometric rotation sensor including a closed light path with a phase modulation means therein comprising:

first signal filtering means for filtering out a first signal from said electrical signal, said first signal having substantially a proper frequency characteristic of said closed light path, given by $\frac{1}{2}\tau$ where $\tau$ is a time required for light to travel around said closed light path;

second signal filtering means for filtering out a second signal from said electrical signal, said second signal having substantially a frequency equal to twice said proper frequency, given by $1/\tau$;

clock means for producing a first clock signal output at said proper frequency and a second clock signal output at twice said proper frequency;

first mixing means for mixing said first signal with said first clock signal;

second mixing means for mixing said second signal with said second clock signal;

serrodyne signal generation means for generating a serrodyne signal at an output, said serrodyne signal generation means having a first input from said first clock output and a second input;

rate bias generation means for generating a periodic rate bias signal, having an input from said first clock output;

gain bias generation means for generating a periodic gain bias signal, having an input from said second clock output;

first integrator means for summing a rate error signal from said output of said first mixing means and sending a control signal to said serrodyne generation means;

second integrator means for summing a gain error signal from said output of said second mixing means and producing a gain signal at an output;

adder means for adding said serrodyne signal from said output of said serrodyne signal generation means to said rate bias signal and to said gain bias signal and producing a total phase modulation signal at an output;

multiplier means for multiplying said gain signal from said output of said second integrator means and said total phase modulation signal at said output of said adder means to produce a multiplied signal at an output; and amplification means for amplifying an input signal from said output of said multiplier means to produce an amplified output signal for application to said phase modulator.

7. The apparatus of claim 6, wherein said first mixing means, said second mixing means, said serrodyne signal generation means, said rate bias generation means, said gain bias generation means, said first integrator means, said second integrator means, said adder means, and said multiplier means all comprise digital electronics, and additionally comprising digital-to-analog conversion means for converting said multiplied signal to an analog signal.

8. The apparatus of claim 6 wherein said successive equal intervals of time each have a duration given by $\tau/m$, where $\tau$ is the transit time for light traveling around said closed light path and m is an integer.

9. The apparatus of claim 8 wherein said integer is 2.

10. The apparatus of claim 6 wherein said means for producing a rate bias signal comprises means for producing a periodic phase bias of $\pi/2$ for a time $\tau$ followed by $-\pi/2$ for a time $\tau$, where $\tau$ is a time required for light to travel around said closed light path.

11. The apparatus of claim 6 wherein said gain bias signal comprises a periodic sequence of step-voltage transitions that gives rise to a sequence of induced phase shifts as follows: $2\pi$, 0, $-2\pi$, and 0 radians.

12. Phase modulation control apparatus for a Sagnac rotation sensor including a phase modulator therein, in which first and second lightwaves counterpropagating around a closed light path are combined to interfere and an electrical signal derived from their relative phase difference represents rotation of said closed light path, comprising:

first bandpass-filtering means for filtering out a first signal representative of said relative phase difference from said electrical signal, said first signal being substantially in a frequency pass band centered on a proper frequency characteristic of said closed light path, given by $\frac{1}{2}\tau$ where $\tau$ is a time required for light to travel around said closed light path;

second bandpass-filtering means for filtering out a second signal representative of said relative phase difference from said electrical signal, said second signal being substantially in a frequency pass band centered on a twice that of said proper frequency;

clock means for producing a first clock signal output at said proper frequency and a second clock signal output at twice said proper frequency;

first digital mixing means for mixing said first signal with said first clock signal;

second digital mixing means for mixing said second signal with said second clock signal;

digital serrodyne signal generation means for generating a serrodyne signal at an output, said serrodyne signal generation means having an input from said first clock output;

digital rate bias generation means for generating a periodic rate bias signal, having an input from said first clock output;

gain bias generation means for generating a periodic gain bias signal, having an input from said second clock output;

first digital integrator means for summing a rate error signal from said output of said first digital mixing means and sending a control signal to said digital serrodyne signal generation means;

second digital integrator means for summing a gain error signal from said output of said second digital mixing means and producing a gain signal at an output;

digital adder means for adding said serrodyne signal from said output of said serrodyne signal generation means to said rate bias signal and to said gain bias signal and producing a total phase modulation signal at an output;

digital multiplier means for multiplying said gain signal from said output of said second integrator means and said total phase modulation signal at said output of said adder means to produce a multiplied signal at an output;

digital-to-analog conversion means for converting a digital input signal from said output of said multiplier means into an analog signal at an output; and amplifier means for multiplying an input signal from said output of said digital-to-analog conversion means to produce an amplified signal for application to said phase modulator.

13. The apparatus of claim 12 wherein said successive equal intervals of time each have a duration given by $\tau/m$, where $\tau$ is the transit time for light traveling around said closed light path and m is an integer.

14. The apparatus of claim 12 wherein said means for producing a rate bias signal comprises means for producing a periodic phase bias of $\pi/2$ for a time $\tau$ followed by $-\pi/2$ for a time $\tau$, where $\tau$ is a time required for light to travel around said closed light path.

15. The apparatus of claim 12 wherein said gain bias signal comprises a periodic sequence of step-voltage transitions that gives rise to a sequence of induced phase shifts as follows: $2\pi$, 0, $-2\pi$, and 0 radians.

16. A method for closed-loop phase modulation to control phase modulator gain errors in an electrical signal representing the phase difference between first and second light signals from lightwaves counterpropagating in an interferometric rotation sensor including a closed light path with a phase modulation means therein comprising:

producing a serrodyne signal responsive to said electrical phase-difference signal, at a first frequency;

producing a rate bias signal consisting of a periodic square wave having said first frequency;

producing a gain bias signal consisting of a sequence of step-voltage transitions at the ends of successive equal intervals of time equal to half the period of said serrodyne signal;

summing said serrodyne signal, said rate bias signal, and said gain bias signal to produce a summed phase modulation signal;

multiplying said summed phase modulation signal with a gain signal derived from said electrical phase-difference signal at a second frequency twice said first frequency to produce a gain-multiplied summed phase modulation signal; and applying said corrected gain-multiplied phase modulation signal to said phase modulation means.

17. The method of claim 16 wherein said successive equal intervals of time each have a duration given by $\tau/m$, where $\tau$ is the transit time for light traveling around said closed light path and m is an integer.

18. The method of claim 17 wherein said integer is 2.

19. The method of claim 16 wherein said means for producing a rate bias signal comprises means for producing a periodic phase bias of $\pi/2$ for a time $\tau$ followed by $-\pi/2$ for a time $\tau$, where $\tau$ is a time required for light to travel around said closed light path.

20. The method of claim 16 wherein said gain bias signal comprises a periodic sequence of step-voltage transitions that gives rise to a sequence of induced phase shifts as follows: $2\pi$, 0, $-2\pi$, and 0 radians.

* * * * *